(12) United States Patent
Franchet et al.

(10) Patent No.: US 9,963,971 B2
(45) Date of Patent: May 8, 2018

(54) METHOD FOR CREATING A METAL REINFORCEMENT WITH INSERT FOR PROTECTING A LEADING EDGE MADE OF COMPOSITE

(71) Applicant: SNECMA, Paris (FR)

(72) Inventors: Jean-Michel Patrick Maurice Franchet, Paris (FR); Gilles Charles Casimir Klein, Mery sur Oise (FR); Gilbert Michel Marin Leconte, Ozoir la Ferriere (FR); Dominique Magnaudeix, Yerres (FR)

(73) Assignee: SNECMA, Paris (FR)

( * ) Notice: Subject to any disclaimer, the term of this patent is extended or adjusted under 35 U.S.C. 154(b) by 699 days.

(21) Appl. No.: 14/394,366

(22) PCT Filed: Apr. 11, 2013

(86) PCT No.: PCT/FR2013/050785
§ 371 (c)(1),
(2) Date: Oct. 14, 2014

(87) PCT Pub. No.: WO2013/156711
PCT Pub. Date: Oct. 24, 2013

(65) Prior Publication Data
US 2015/0104323 A1    Apr. 16, 2015

(30) Foreign Application Priority Data

Apr. 19, 2012  (FR) ...................................... 12 53595

(51) Int. Cl.
*F01D 5/00* (2006.01)
*F01D 5/14* (2006.01)
(Continued)

(52) U.S. Cl.
CPC ............. *F01D 5/005* (2013.01); *B21D 53/78* (2013.01); *B23K 20/021* (2013.01); *B23P 15/04* (2013.01);
(Continued)

(58) Field of Classification Search
CPC ... B21D 53/78; B21J 5/12; B21K 3/04; B23K 20/021; B23P 15/04; F01D 5/005;
(Continued)

(56) References Cited

U.S. PATENT DOCUMENTS

| 4,010,530 A | 3/1977 | Delgrosso et al. |
| 4,738,594 A * | 4/1988 | Sato ...................... F04D 29/388 416/213 A |

(Continued)

FOREIGN PATENT DOCUMENTS

| EP | 1 574 270 A1 | 9/2005 |
| EP | 1 643 011 A1 | 4/2006 |

(Continued)

OTHER PUBLICATIONS

U.S. Appl. No. 14/402,182, filed Nov. 19, 2014, Leconte, et al.
International Search Report dated Jul. 10, 2013 in PCT/FR2013/050785 filed Apr. 11, 2013.

*Primary Examiner* — Woody Lee, Jr.
*Assistant Examiner* — Brian O Peters
(74) *Attorney, Agent, or Firm* — Oblon, McClelland, Maier & Neustadt, L.L.P.

(57) ABSTRACT

A method for producing a metal reinforcement for protecting a leading edge of a compressor blade of composite, including: creating a core that has a shape of an internal cavity of the reinforcement; creating an insert made of an alloy of a hardness greater than that of the reinforcement; shaping sheet metal by stamping with the creation, upstream of the core, a cavity between the metal sheets, which cavity is (Continued)

configured to accept the insert, positioning the sheets around the core with the insert placed in the cavity and securing the assembly together; creating a vacuum and closing the assembly by welding; consolidation by hot isostatic pressing; cutting the assembly to extract the core and separate the reinforcement; creating an external profile of the reinforcement by a final machining operation that reveals a material of the insert.

9 Claims, 2 Drawing Sheets

(51) Int. Cl.
  F01D 5/28      (2006.01)
  B21D 53/78     (2006.01)
  B23K 20/02     (2006.01)
  B23P 15/04     (2006.01)
  F04D 29/02     (2006.01)
  F04D 29/32     (2006.01)
  B23K 101/00    (2006.01)
(52) U.S. Cl.
  CPC .............. *F01D 5/147* (2013.01); *F01D 5/282* (2013.01); *F04D 29/023* (2013.01); *F04D 29/324* (2013.01); *B23K 2201/001* (2013.01); *F05D 2230/20* (2013.01); *F05D 2240/303* (2013.01); *F05D 2300/174* (2013.01); *F05D 2300/506* (2013.01); *Y02T 50/673* (2013.01); *Y10T 29/49234* (2015.01)
(58) Field of Classification Search
  CPC ........ F01D 5/147; F01D 5/282; F05D 29/023; F05D 29/324; F05D 2230/10; F05D 2230/20; F05D 2230/236; F05D 2230/42; F05D 2230/50; F05D 2230/60; F05D 2230/90; F05D 2240/121; F05D 2240/122; F05D 2240/303; F05D 2240/304; F05D 2300/10; F05D 2300/13; F05D 2300/15; F05D 2300/174; F05D 2300/20; F05D 2300/506; F05D 2300/603; F05D 2300/702
  See application file for complete search history.

(56) References Cited

U.S. PATENT DOCUMENTS

| | | | |
|---|---|---|---|
| 5,383,985 A * | 1/1995 | Coulon | B23K 20/021 |
| | | | 148/527 |
| 8,782,887 B2 * | 7/2014 | Franchet | B21D 53/78 |
| | | | 29/889.7 |
| 2005/0278950 A1 | 12/2005 | Despreaux et al. | |
| 2006/0068214 A1 | 3/2006 | Gigliotti et al. | |
| 2008/0265095 A1 * | 10/2008 | Lee | B63B 1/244 |
| | | | 244/129.1 |
| 2011/0023301 A1 | 2/2011 | Jones | |
| 2012/0317810 A1 | 12/2012 | Klein et al. | |
| 2013/0008027 A1 | 1/2013 | Franchet et al. | |

FOREIGN PATENT DOCUMENTS

| | | |
|---|---|---|
| EP | 2 281 645 A1 | 2/2011 |
| FR | 2 956 602 A1 | 8/2011 |
| FR | 2 957 545 A1 | 9/2011 |
| JP | 2004-245221 A | 9/2004 |
| WO | WO 97/10066 A1 | 3/1997 |
| WO | WO 2010/084941 A1 | 7/2010 |
| WO | WO 2012/042160 A1 | 4/2012 |

* cited by examiner

METHOD FOR CREATING A METAL REINFORCEMENT WITH INSERT FOR PROTECTING A LEADING EDGE MADE OF COMPOSITE

BACKGROUND OF THE INVENTION

Field of the Invention

The field of the present invention is that of the manufacture of metal parts and more specifically that of the manufacture of leading edges or trailing edges in titanium for the aeronautics industry, such as leading edges for turbine engine fan blades, with a wide chord, which are made of composite material.

Description of the Related Art

For reasons of weight and cost, the fan blades of turbojet engines are nowadays mostly made of a composite material. These parts, which are subjected to high levels of mechanical stress, due to their speed of rotation and the aerodynamic load that they bear, must also resist any impacts from particles or foreign bodies that may enter the airstream. For this reason, they are protected at their leading edge and/or at their trailing edge by a metal part which covers their ends and is bonded to the composite material of the vane.

The manufacturing data sheet currently used for leading edges made of titanium for composite fan blades is onerous and complex to implement, which leads to significant costs. This is because it is mainly based on hot forming operations, which require equipment that withstands the temperatures used. It also requires a significant number of machining operations to be performed, both at the intermediate parts stage and at the final stage of production.

Furthermore, it is necessary to address the problem of the erosion resistance of the leading edge produced in this way. Various solutions have been devised for this, such as that which consists in forming a structure of two layers of metal bonded to one another. In that case, a first layer is produced from a titanium-based alloy that enables the deformation of the leading edge on impact to be accommodated, and a second layer is produced from a nickel-based alloy to protect the leading edge against erosion. This solution can be contemplated only in the case of simple shapes for the leading edge reinforcement, for which shapes the part can be obtained by simply folding thin metal sheets. For reinforcements with a complex shape, the manufacturing data sheet for a reinforcement made of a nickel-based alloy will be very complicated to implement and the part will be expensive to produce.

Lastly, for reasons of weight and mechanical strength, these leading or trailing edges, which are generally made of titanium, are relatively thin. Given this thinness, the use of a manufacturing method that includes assembling metal sheets via a superplastic forming and diffusion bonding (SPFDB) process has of course been proposed. Such a method is described in the applicant's patent application EP 1574270.

However, it is only with difficulty that this method allows the internal shape of the cavity to be controlled and, in particular, it restricts the possibilities for optimum joining of the metal sheets at the end of the cavity. To remedy this, the applicant has devised a method for manufacturing titanium leading edges or trailing edges that uses a core on which titanium sheets are welded to one another and applied around the core by hot isostatic pressing. This method was the subject of the patent application published under the number FR 2957545.

Although this method greatly facilitates the production of leading edges, in its present form it does not take into account the need, mentioned above, to reinforce the leading edge in order to improve the resistance of the titanium part to the erosion encountered in use.

BRIEF SUMMARY OF THE INVENTION

The object of the present invention is to remedy these disadvantages by proposing a simple and inexpensive method for producing a more erosion-resistant titanium reinforcement for a leading edge or trailing edge of a turbine engine blade.

To that end, the invention relates to a method for producing a metal reinforcement for protecting a leading edge or trailing edge of an aeronautical engine blade made of composite material, by stamping metal sheets and diffusion-welding them to one another, characterised in that it includes the steps of:
producing a core that has the shape of the internal cavity of the metal reinforcement to be produced, one of its faces reproducing the internal shape of the suction face of the reinforcement and the other face reproducing the internal shape of the pressure face of the reinforcement;
producing an insert made of an alloy of a hardness greater than that of the reinforcement;
initial shaping of the metal sheets by stamping in order to bring them closer to the shape of the suction face and pressure face of said reinforcement, with the formation, upstream of said core, of a cavity between the metal sheets that is able to receive said insert;
positioning said metal sheets around said core with the insert being placed in said cavity and the assembly being joined together;
placing the assembly under vacuum and closing said assembly by welding;
joining the assembly by hot isostatic pressing;
producing the external profile of the reinforcement by a final machining operation that reveals the material of the insert;
cutting the assembly to extract the core and separate the reinforcement.

Thus, a reinforcement with a hardened tip is obtained, which is produced economically, because this operation of adding an insert is performed without an additional operation, in comparison with the methods of the prior art.

Preferably, the elastic limit for cold working of the alloy used for the insert is greater than that of the material used for the reinforcement.

In a first embodiment, the metal sheets are made of titanium alloy and the insert is made of a titanium alloy selected from a range comprising Ti5553, Ti10-2-3 or Ti17.

In a second embodiment, the metal sheets are made of titanium alloy and the insert is made of an intermetallic titanium alloy.

Advantageously, the intermetallic alloy is a titanium-aluminium alloy.

In a third embodiment, the metal sheets are made of titanium alloy and the insert is made of an orthorhombic alloy.

Advantageously, the orthorhombic alloy is a titanium-aluminium-niobium alloy.

The invention also relates to a metal reinforcement for protecting a leading edge or trailing edge of an aeronautical engine blade made of composite material, having at its upstream end an insert made of an alloy of a hardness greater than that of the reinforcement and fixed to said reinforcement by diffusion welding.

Advantageously, the material of the reinforcement is a first titanium alloy and the material of the insert is a second titanium alloy, of which the hardness and elastic limit for cold working are greater than those of said reinforcement.

Preferably, the titanium alloy of the reinforcement is TA6V and the alloy of the insert is selected from the alloys Ti5553, Ti10-2-3, Ti17, TiAl and Ti2AlNb.

BRIEF DESCRIPTION OF THE SEVERAL VIEWS OF THE DRAWINGS

The invention will be better understood, and its other aims, details, features and advantages will become more clearly apparent on reading the following detailed explanatory description of an embodiment of the invention given as a purely illustrative and non-restrictive example, with reference to the accompanying schematic drawings.

In the drawings.

DETAILED DESCRIPTION OF THE INVENTION

Figure 1:
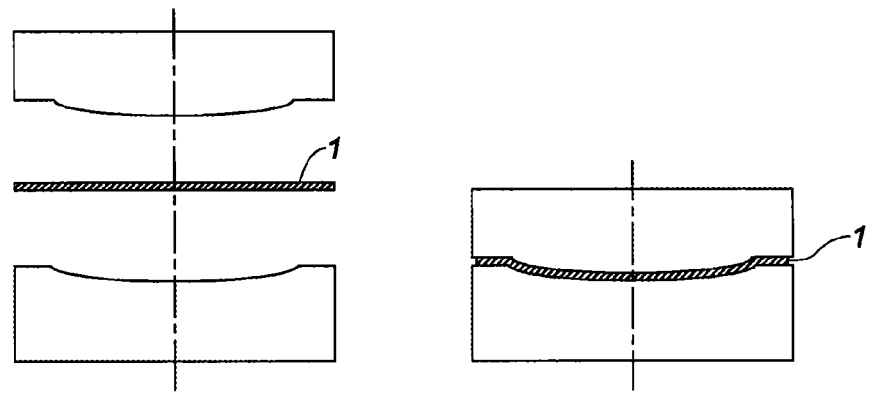
FIG. 1 is a schematic view of a step of shaping metal sheets, during the production of a reinforcement for a leading edge by a method according to the prior art.

With reference to FIG. 1, there can be seen, in two steps, an operation of hot forming a sheet 1 of titanium in order to give it, on one of its faces, a shape that corresponds approximately to the external shape of a refractory core, said core having the precise shape to be given to the internal cavity of the leading edge. Two metal sheets are shaped in this way in succession, one of which is intended to become the suction face 1E of the leading edge and the other its pressure face 1I.

Figure 2:
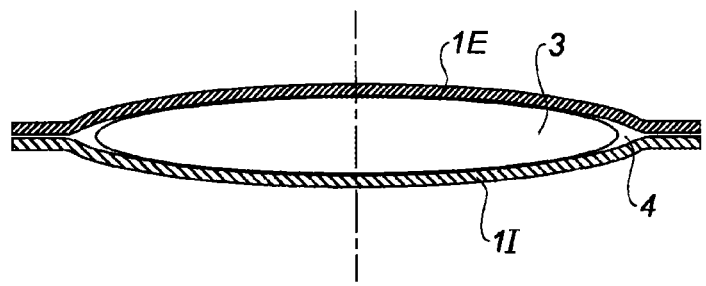
FIG. 2 is a schematic view of a step of pre-assembling metal sheets during the production of a reinforcement for a leading edge by a method according to the prior art.
Figure 3:
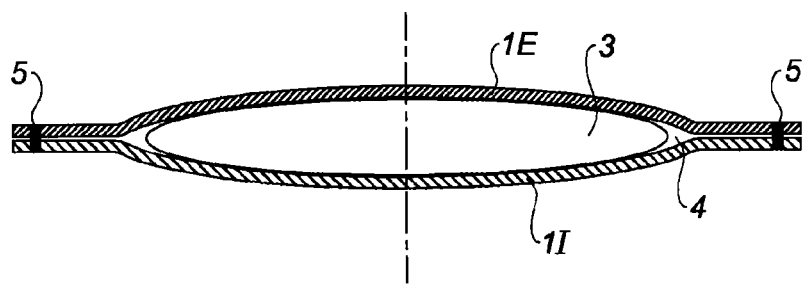
FIG. 3 is a schematic view of a step of assembling metal sheets during the production of a reinforcement for a leading edge by a method according to the prior art.

As shown, FIG. 1 to 3 show the simultaneous production of two leading edge reinforcements, using a property of symmetry of these parts.

FIG. 2 shows a core 3, made of refractory material (or made of a metal alloy, such as IN100, which has a coefficient of expansion that is very different from that of the titanium of the leading edge), the core being surrounded by two metal sheets 1E and 1I that, as already stated, are preformed in order to adapt to fit the core over a large part of their length. It will be noted that the two metal sheets are not shaped so that they meet, after assembly, so as to face each other at a straight angle at the tip of the leading edge, but that they end in parts that are approximately parallel and aligned along the median plane of the core.

Consequently, the two metal sheets do not exactly enclose the core on which they will be assembled at the tip of the leading edge. A residual space 4 is left, which will be absorbed during subsequent steps.

In this configuration, the metal sheets are assembled by tack welding (not shown in the figure), and TIG welding (arc welding with a non-consumable tungsten electrode, in an inert atmosphere), in order to join them to one another and hold them in place on the core 3.

FIG. 3 shows, according to the prior art, the result of a step of assembling two metal sheets 1E and 1I, around the refractory core, by electron beam (EB) welding. This weld is made along a seam 5, parallel to the lateral edges of the metal sheets, as can be seen in FIG. 3, but also to the transverse ends of the part (not shown in the figure).

Figure 4:
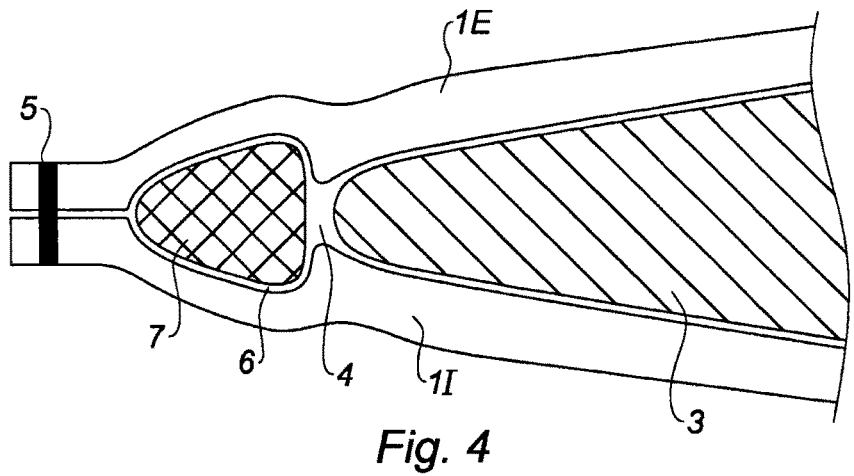
FIG. 4 is a schematic view of the step of pre-assembling metal sheets by a method according to an embodiment of the invention.

FIG. 4 shows the step of assembling the two metal sheets 1E and 1I in the case of a method according to the invention. During the step of shaping the metal sheets, a deformation of each sheet has been performed so as to create a cavity 6 between them at the time of pre-assembly. This cavity is made between the weld seam 5 and the front tip of the core 3, beyond the residual space 4, in a position further upstream than the core 3. A position further upstream means a position further forward towards the leading edge. This cavity has been filled before pre-assembly by an insert 7, made of an alloy more resistant to erosion than the metal of the metal sheets.

The next step, assembly of the metal sheets by a hot isostatic pressing (HIP) process, is similar to that used in the prior art. The HIP process produces a deformation of the metal sheets 1E and 1I, which are flattened against the core 3 and against the insert 7, to the shapes of which the metal sheets conform perfectly.

Figure 5:
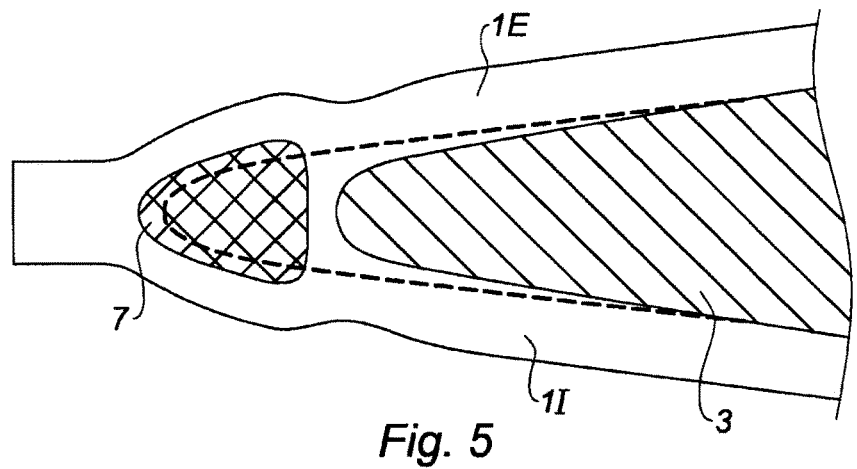
FIG. 5 is a schematic view in cross section of a reinforcement for a leading edge after the step of HIP pressing according to the method of the invention.

FIG. 5 shows the state of the reinforcement of the leading edge, after this operation. The residual space 4 has been eliminated and the insert 7 is surrounded in the front part of the reinforcement. The dotted line represents the desired shape of the leading edge, which fits perfectly within the volume obtained at the end of this assembly operation.

Figure 6:
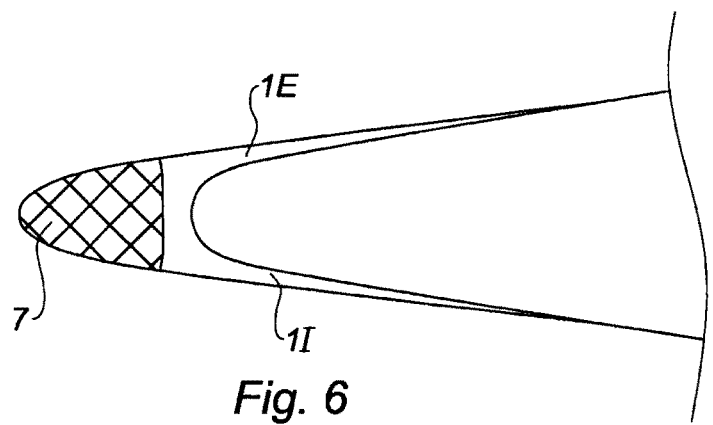
FIG. 6 is a view in cross section of a reinforcement for a leading edge according to the invention, after a final machining operation.

FIG. 6 shows the leading edge reinforcement obtained at the end of the method of production according to the invention. The part obtained has been cut along the dotted line of the preceding figure, revealing the metal of the insert 7, and the core 3 has been removed, by techniques known to a person skilled in the art. The leading edge reinforcement is then ready to be fitted to a blade of composite material, for example by bonding, in order to give said blade the necessary resistance for a long service life in use.

The progression of the manufacturing of a leading edge reinforcement via a method according to an embodiment of the invention will now be described.

The principle of the method consists, as in the prior art, in diffusion welding two sheets of titanium, one being the pressure face and the other being the suction face, and shaping them around a core. The operation begins with a standard stamping operation which brings the metal sheets into a shape close to the shape desired for the leading edge reinforcement. For this, a core that has the shape of the internal cavity of the metal reinforcement has been made beforehand, one of its faces reproducing the internal shape of the suction face of the leading edge and the other face reproducing the internal shape of the pressure face of the leading edge.

According to the invention, first of all, an insert 7 is produced from an erosion-resistant material, and its outline is defined so that it is in excess of the volume that it is desired to be obtained therefor at the end of the leading edge.

It can be obtained by machining but also, more advantageously, by extrusion or forging in order to minimise the machining operations. Secondly, during stamping, a specific deformation is made in each metal sheet 1 so as to create a cavity 6 between the two metal sheets 1E and 1I when they are pre-assembled. The volume of this cavity 6 corresponds to that of the insert 7 and its position matches the desired position at the tip of the leading edge in order to place the erosion-resistant material there.

The next part of the method is similar to that of the prior art, with preassembly of the metal sheets around the core 3 and the insert 7 by a tack welding and TIG welding operation, along the lateral edges of the metal sheets. The assembly is then placed in a vacuum enclosure so that electron beam welding can be carried out. An uninterrupted weld seam is made both along the lateral edges of the metal sheets and also on their transverse edges, which makes it possible to completely surround the core 3 and the insert 7 and to close up the assembly. Thus, the vacuum is maintained between the metal sheets 1 and the core 3, and in particular in the residual space 4 left between the metal sheets 1E, 1I, the tip of the core 3 and the insert 7.

The assembly formed by the core 3, the insert 7 and the two metal sheets 1E and 1I then undergoes a hot isostatic pressing operation, conducted at a temperature of approximately 940° C., in the case concerned of a blade made of TA6V titanium alloy. At that temperature, the metal is relatively soft and can creep under the action of the pressure of approximately 1000 bar that is applied to it. The two metal sheets deform so that they perfectly conform to the shape of the core 3 and that of the insert 7, eliminating the residual space 4. At the same time, under the effect of the heat and the pressure, the two metal sheets are welded to one another by diffusion and are welded to the insert by diffusion.

The last part of the method includes a step of removing the excess material along the lateral edges of the leading edge reinforcement, by a cutting operation along the line shown as a dotted line in FIG. 5 and a final machining operation that enables the leading edge to be given the desired external shape. This final machining operation reveals the metal of the insert 7, which is thus placed at the end of the leading edge reinforcement, where the problems of erosion are most critical.

The concept of the invention is based on the principle of locally reinforcing the tip of the leading edge of the composite fan blades with an alloy that is more erosion-resistant than the base alloy of titanium (generally TA6V) used for the reinforcement.

The selection of the erosion-resistant material must be such that this material can be diffusion-welded to the metal sheets of the pressure face and the suction face during the step of shaping by hot isostatic pressing (HIP). It must therefore be chemically compatible with the titanium alloy of the metal sheets of the pressure face and the suction face and, in particular, it must not lead to mutual contamination of the two alloys. It must also have a temperature window for diffusion welding that is close to that of the titanium alloy of the metal sheets in order to allow diffusion welding between the two alloys. Preferably, but not exclusively, the alloy of the insert 7 is therefore selected to be titanium-based for reasons of compatibility with the alloy of the metal sheets of the pressure face and the suction face. This alloy must be characterised by a high degree of hardness and a high elastic limit at low temperature, and for this reason, it is preferably selected from the Ti5553, Ti10-2-3 or Ti17 range of alloys. It can also be a TiAl intermetallic alloy or a Ti2AlNb orthorhombic alloy.

The invention has been described using as an example a fan blade and its leading edge. It is clear that it can be used equally well on any turbine engine blade, whether this is a blade of any stage whatsoever of a compressor or a turbine blade.

The invention claimed is:

1. A method for producing a metal reinforcement for protecting a leading edge or a trailing edge of an aeronautical engine blade made of composite material, the method comprising:
    producing a core that has a shape of an internal cavity of the metal reinforcement to be produced, a first face of the core corresponding to an internal shape of a suction face of the reinforcement and a second face of the core corresponding to an internal shape of a pressure face of the reinforcement;
    producing an insert made of an alloy of a hardness greater than that of the reinforcement, the insert being made of a titanium-based alloy;
    initial shaping metal sheets by stamping to bring metal sheets closer to the shape of the suction face and pressure face of the reinforcement, by leaving a residual space between the metal sheets, and forming, upstream or downstream of the core, a cavity between the metal sheets that is configured to receive the insert, the cavity being positioned beyond the residual space, in a position further upstream or further downstream than the core towards the leading edge or the trailing edge, a width of the cavity increasing from a first end of the cavity to a second end of the cavity, the second end of the cavity being closer to the core than the first end of the cavity;
    positioning the metal sheets around the core with the insert being placed in the cavity to form an assembly;
    placing the assembly under vacuum and closing the assembly by welding;
    joining the assembly by hot isostatic pressing so as to diffusion-weld the metal sheets and the insert to each other;
    producing an external profile of the reinforcement by a final machining operation that reveals the material of the insert at an end of the reinforcement by removing a portion of the metal sheets and the insert that are diffusion-welded to each other, the insert constituting a portion of the suction face of the reinforcement and a portion of the pressure face of the reinforcement; and
    cutting the assembly to extract the core and separate the reinforcement, the core and the insert being two distinct parts.

2. A method according to claim 1, wherein an elastic limit for cold working of the alloy used for the insert is greater than that of the material used for the reinforcement.

3. A method according to claim 1, wherein the metal sheets are made of titanium alloy and wherein the insert is made of a titanium alloy selected from Ti5553, Ti10-2-3, or Ti17.

4. A method according to claim 1, wherein the metal sheets are made of titanium alloy and wherein the insert is made of an intermetallic titanium alloy.

5. A method according to claim 4, wherein the intermetallic alloy is a titanium-aluminium alloy.

6. A method according to claim 1, wherein the metal sheets are made of titanium alloy and wherein the insert is made of an orthorhombic alloy.

7. A method according to claim 6, wherein the orthorhombic alloy is a titanium-aluminium-niobium alloy.

8. A method according to claim 1, wherein during the joining of the assembly by hot isostatic pressing, the residual space is eliminated and the insert is surrounded in a front part of the reinforcement.

9. A method for producing a metal reinforcement for protecting a leading edge or a trailing edge of an aeronautical engine blade made of composite material, the method comprising:
  producing a core that has a shape of an internal cavity of the metal reinforcement to be produced, a first face of the core corresponding to an internal shape of a suction face of the reinforcement and a second face of the core corresponding to an internal shape of a pressure face of the reinforcement;
  producing an insert made of an alloy of a hardness greater than that of the reinforcement, the insert being made of a titanium-based alloy;
  initial shaping metal sheets by stamping to bring metal sheets closer to the shape of the suction face and pressure face of the reinforcement, by leaving a residual space between the metal sheets, and forming, upstream or downstream of the core, a cavity between the metal sheets that is configured to receive the insert, the cavity being positioned beyond the residual space, in a position further upstream or further downstream than the core towards the leading edge or the trailing edge;
  positioning the metal sheets around the core with the insert being placed in the cavity to form an assembly;
  placing the assembly under vacuum and closing the assembly by welding;
  joining the assembly by hot isostatic pressing so as to diffusion-weld the metal sheets and the insert to each other;
  producing an external profile of the reinforcement by a final machining operation that reveals the material of the insert at an end of the reinforcement by removing a portion of the metal sheets and the insert that are diffusion-welded to each other, the insert constituting a portion of the suction face of the reinforcement and a portion of the pressure face of the reinforcement; and
  cutting the assembly to extract the core and separate the reinforcement, the core and the insert being two distinct parts,
  wherein during the joining of the assembly by hot isostatic pressing, the residual space is eliminated and the insert is surrounded upstream or downstream of the reinforcement.

* * * * *